United States Patent
Lam et al.

(10) Patent No.: US 7,721,064 B1
(45) Date of Patent: May 18, 2010

(54) MEMORY ALLOCATION IN MEMORY CONSTRAINED DEVICES

(75) Inventors: Ioi Kim Lam, Mountain View, CA (US); Oleg Pliss, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 468 days.

(21) Appl. No.: 11/772,635

(22) Filed: Jul. 2, 2007

(51) Int. Cl.
*G06F 12/00* (2006.01)
*G06F 13/00* (2006.01)

(52) U.S. Cl. ............... 711/170; 711/100; 711/154; 711/202

(58) Field of Classification Search ............ 711/100, 711/154, 170, 200, 202
See application file for complete search history.

(56) References Cited

U.S. PATENT DOCUMENTS

| | | | | |
|---|---|---|---|---|
| 4,403,283 A | * | 9/1983 | Myntti et al. ............... 711/2 |
| 5,159,681 A | * | 10/1992 | Beck et al. ................ 358/1.17 |
| 5,860,141 A | * | 1/1999 | Washington et al. ........ 711/202 |
| 5,923,847 A | * | 7/1999 | Hagersten et al. ........... 709/215 |
| 6,578,071 B2 | * | 6/2003 | Hagersten et al. ........... 709/215 |
| 6,947,051 B2 | * | 9/2005 | Gossalia et al. ............ 345/543 |
| 7,484,070 B1 | * | 1/2009 | Walton et al. ............... 711/202 |

* cited by examiner

*Primary Examiner*—Tuan V. Thai
(74) *Attorney, Agent, or Firm*—Park, Vaughan & Fleming LLP

(57) ABSTRACT

Apparatus, methods and computer program products are disclosed to improve allocation of physical memory in a memory limited device when the amount of unallocated memory approaches a threshold. In this situation the disclosed technology will identify memory pages that have substantially the same content, identify the process-contexts that map to the identified memory pages, remap these process-contexts to one of the identical memory pages, recycle all of the other identical memory pages to increase the amount of unallocated memory, and conditions the process-contexts to appropriately trap accesses to the mapped page.

18 Claims, 7 Drawing Sheets

MEMORY ALLOCATION IN MEMORY CONSTRAINED DEVICES

BACKGROUND

1. Technical Field

The disclosed technology relates to the field of memory management systems.

2. Background Art

Even with the dramatic decline in memory costs for small computing devices, there exist many memory-constrained computing devices that do not have the capability of using a storage device to temporally swap-out the content of some portion of memory to free that portion of memory for another use. Consequently, these devices can fail to operate properly if they allocate most or all of their available memory.

A number of techniques have been developed to conserve memory on such memory-constrained computing devices. One of these techniques is termed "copy-on-write". In general, copy-on-write means that a portion of the device's memory (that contains data, code, etc.) is shared by multiple processes executing in the device. The processes sharing the memory are each mapped to, and have read access to that portion of memory (but do not have write access). Thus, only a single copy of the shared information is in the devices memory and shared by all the sharing processes instead of each of the processes allocating its own copy of the identical information. This works so long as none of the sharing processes need to modify the shared memory. If a process attempts to modify the shared memory, a private copy of the shared information is created by allocating another portion of memory and copying the contents of the shared portion to the newly allocated portion of memory. The newly allocated portion of memory is mapped to the modifying process and the modifying process is given both read and write access to its private copy of the information. The following quotation from a Wikipedia article succinctly summarizes copy-on-write technology:

"The fundamental idea [of copy-on-write] is that if multiple callers ask for resources which are initially indistinguishable, you can give them pointers to the same resource. This fiction can be maintained until a caller tries to modify its "copy" of the resource, at which point a true private copy is created to prevent the changes becoming visible to everyone else. All of this happens transparently to the callers. The primary advantage is that if a caller never makes any modifications, no private copy need ever be created.

Copy-on-write finds its main use in virtual memory operating systems; when a process creates a copy of itself, the pages in memory that might be modified by either the process or its copy are marked copy-on-write. When one process modifies the memory, the operating system's kernel intercepts the operation and copies the memory so that changes in one process's memory are not visible to the other.

Another use is in the calloc function. This can be implemented by having a page of physical memory filled with zeroes. When the memory is allocated, the pages returned all refer to the page of zeroes and are all marked as copy-on-write. This way, the amount of physical memory allocated for the process does not increase until data is written. This is typically only done for larger allocations.

Copy-on-write can be implemented by telling the MMU that certain pages in the process's address space are read-only. When data is written to these pages, the MMU raises an exception which is handled by the kernel, which allocates new space in physical memory and makes the page being written to correspond to that new location in physical memory." Excerpts from the Wikipedia Copy-On-Write article having the citation of http://en.wikipedia.org/w/index.php?title=Copy-on-write&oldid=120133246 (last visited Apr. 9, 2007).

One skilled in the art will understand that a process can be for example, threads-of-execution, a task, a program being executed by a computing element etc.

A number of computer operating systems use copy-on-write technology when spawning a copy of an executing process (for example, in many UNIX variants, the fork( ) system service uses copy-on-write technology to spawn a child process of the parent where the child process-context and the parent process-context share substantial portions of the same physical memory. Thus, a parent process and many child processes can share large amounts of physical memory. Because of the potential savings in physical memory usage, copy-on-write technology is often used with memory-constrained computing devices.

However, there are disadvantages to copy-on-write technology. In particular, if a write operation is attempted by one of the executing processes, physical memory must be allocated for at least the process attempting the write operation. Some copy-on-write embodiments copy the physical memory page to which the write operation is directed. Some copy-on-write embodiments allocate a separate physical memory page for each process-context that shared the copy-on-write page.

In a memory-constrained computing device, the consumption of physical memory resulting from a write attempt to a copy-on-write physical memory page (or a denial of service attack directed to physical memory) can starve a memory-constrained computing device of the memory needed to continue functioning. In this circumstance the device will fail due to the inability to allocate needed memory and the device generally will need to be restarted to recover.

Some embodiments copy-on-write for memory-constrained computing devices can use well-known compression techniques to create a compressed copy of a physical memory page. The physical memory page can then be allocated to another process. However, subsequent memory access to the compressed page requires the system to allocate a memory page within which to decompress the compressed page prior to satisfying the memory access operation. This approach can significantly impact the performance of the device.

For many copy-on-write uses, the content of a shared physical memory page is only minimally modified. Nevertheless, when an attempt is made to modify the shared physical memory page another entire physical memory page is allocated and copied responsive to the copy-on-write operation. Thus, even minor modifications to the content of a shared physical memory page can lead to memory starvation.

It would be advantageous to have some method to enable a memory-constrained computing device to more gracefully recover from low memory situations when multiple physical memory pages have substantially similar content or identical content.

DETAILED DESCRIPTION

One aspect of the technology disclosed herein is a computer controlled method within a computing environment. Other aspects relate to devices that perform the method or to computer program products that incorporate computer instructions that cause a computer to perform the method. The method can be performed within a computing environment such as a traditional computer, or such as a within a device that contains processing logic that operates partially or completely as a processing unit. The computing environment includes a memory management unit that is configured to map a virtual memory page of a process-context to a physical memory page. Access to the physical memory page by the process-context is controlled by an access permission logic responsive to one or more memory access modes. The access permission logic is configured to post an exception on detection of a prohibited access attempt of the physical memory page by the process-context. The plurality of memory access modes includes a read access mode and a write access mode. In addition, the computing environment includes the capability to allocate and recycle physical memory pages.

Within this computing environment, the disclosed technology receives a physical memory allocation request and determines whether the act of satisfying the physical memory allocation request would reduce the amount of available or unallocated memory below a threshold. If the act of satisfying the physical memory allocation request would reduce the amount of unallocated memory below a threshold, the method remaps process-contexts within the computing environment to recycle some memory allocated to the process-contexts. This can be accomplished by identifying a first process-context containing a first process-context mapping to a first allocated physical memory page and a second process-context containing a second process-context mapping to a second allocated physical memory page where the first allocated physical memory page and the second allocated physical memory page have substantially similar content or identical content. Once the first process-context and the second process-context are identified, the method alters the second process-context mapping to map to the first allocated physical memory page and specifies one or more access modes on the first allocated physical memory page. Then the method recycles the second allocated physical memory page and satisfies the physical memory allocation request.

Figure 1:
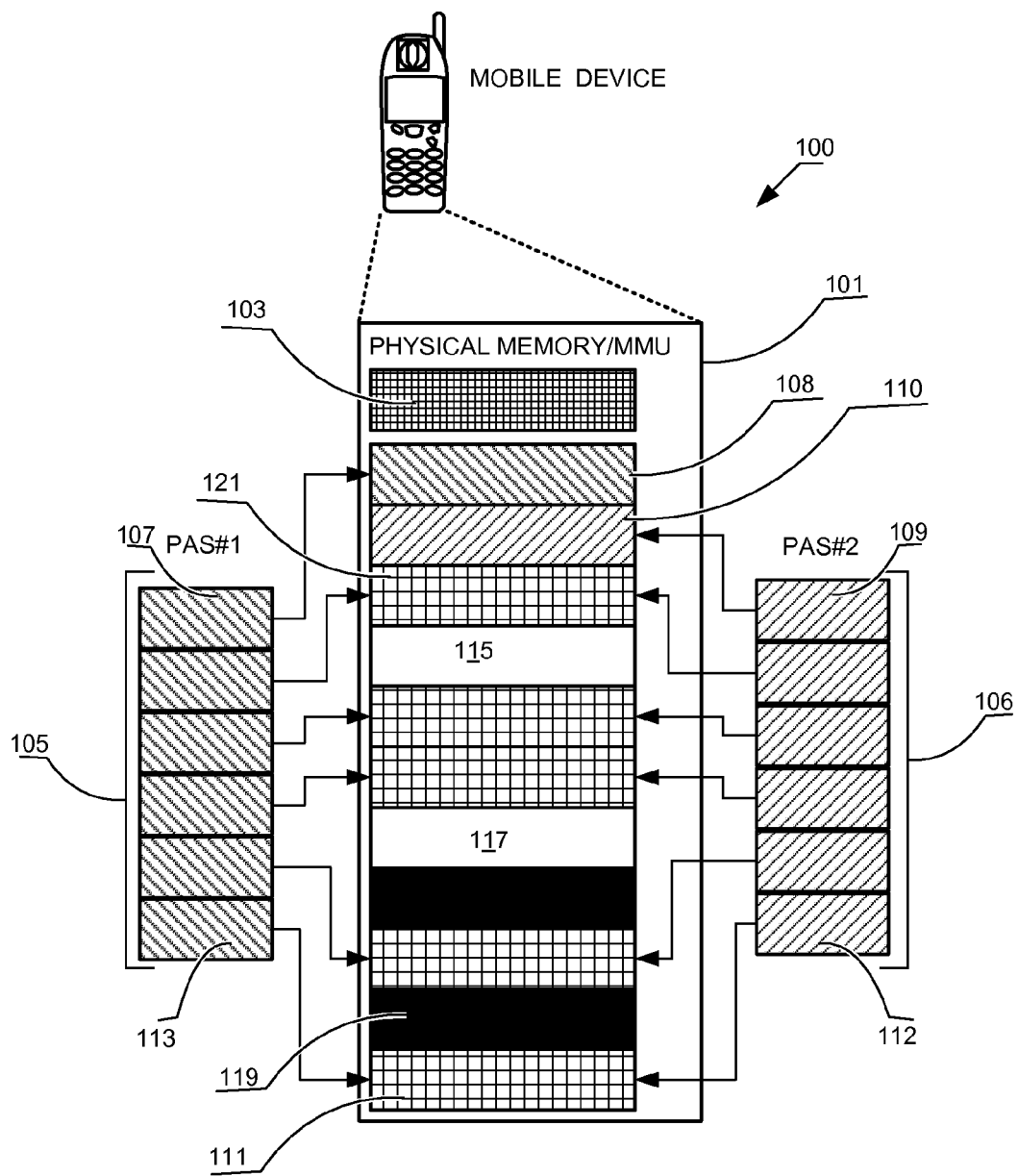
FIG. 1 illustrates a shared physical memory mapping in a prior art memory-constrained computing device.

FIG. 1 illustrates a memory-constrained computing device 100 that is an example of a computing environment that includes a physical memory/memory management unit 101 and a processing unit (not shown) configured to execute instructions stored in the physical memory/memory management unit 101. The physical memory/memory management unit 101 is configured such that the memory management unit can map a virtual memory page of a process-context to a physical memory page. Access to the physical memory page by the process-context is controlled by an access permission logic and conditioned on one or more memory access modes associated with the process-context. Some of the physical memory/memory management unit 101 memory is allocated to the device's operating system (for example, a system memory page 103). The operating system supports establishment of multiple process-contexts each of which is organized as one or more virtual memory pages (for example, a PAS#1 process-context 105 and a PAS#2 process-context 106) and an execution environment (which can include a program counter, stack context and register context used by the process-context). In this example, each process address space has one of its virtual memory pages mapped to a non-shared physical memory page (note that in this example, a PAS#1 first virtual memory page 107 is mapped to a PAS#1 read-write physical memory page 108 while a PAS#2 first virtual memory page 109 is mapped to a PAS#2 read-write physical memory page 110, which is a different physical memory page from the PAS#1 read-write physical memory page 108).

Many of the physical memory pages are shared by the PAS#1 process-context 105 and the PAS#2 process-context 106 (for example, notice that a shared copy-on-write physical memory page 113 is shared by a last virtual memory page 111 of the PAS#1 process-context 105) and a last virtual memory page 112 of the PAS#2 process-context 106. The memory access mode enabled for the PAS#1 process-context 105 and the PAS#2 process-context 106 to the shared physical memory pages are read and/or execute only. Thus, an attempt by either process-context to perform a write operation to a virtual address that maps to a physical address in any of the shared pages will be trapped by the memory management unit.

The physical memory/memory management unit 101 also includes an available physical memory page 115 and an available physical memory page 117 which are currently not used and can be allocated to satisfy a physical memory allocation request. The physical memory/memory management unit 101 also includes an unavailable physical memory page 119 that, for example, is in use by some other process address space or by the operating system. The unavailable physical memory page 119 is not available to satisfy a physical memory allocation request.

Figure 2:
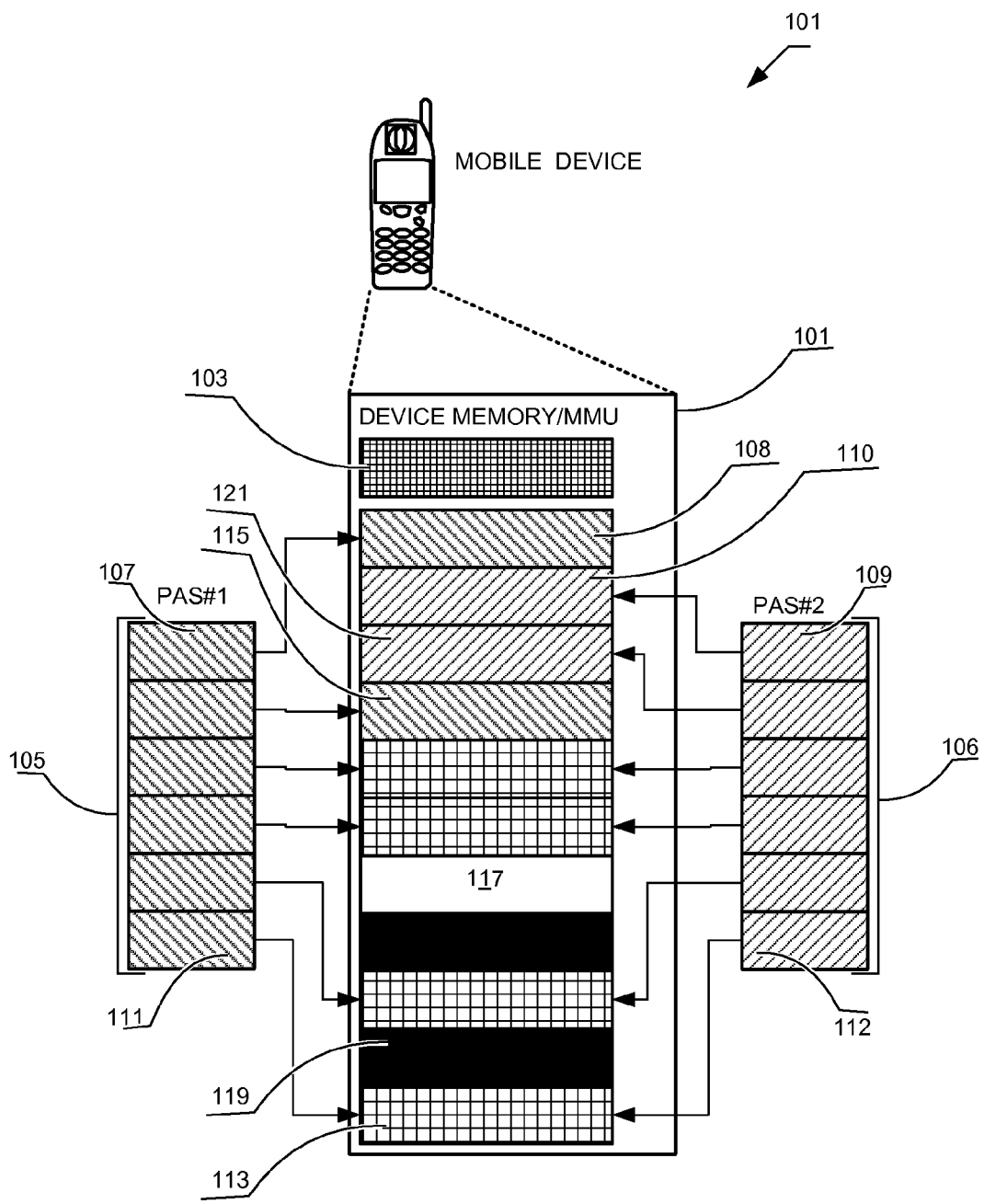
FIG. 2 illustrates a subsequent physical memory mapping in a prior art memory-constrained computing device resulting from a write access to the shared physical memory of FIG. 1.

FIG. 2 illustrates a possible state of the memory-constrained computing device 100 after the PAS#1 process-context 105 attempts a write operation to a virtual address within its second virtual memory page. When the memory write operation is attempted, the memory management unit traps the write attempt (because the memory management unit maps the virtual address in the virtual memory page to a physical address in a physical memory page 121 that is shared); and the access permission logic detects the write attempt as a prohibited access attempt with respect to the memory access mode of the physical memory page 121 with respect to the PAS#1 process-context 105) and posts an exception condition to the operating system. The operating system receives the exception and determines that the physical memory page 121 is marked as copy-on-write. The operating system allocates an available physical memory page (such as the available physical memory page 115), copies the content of the physical memory page 121 to the available physical memory page 115, enables the memory access modes for the available physical memory page 115 to allow at least read/write access by the PAS#1 process-context 105, removes the second virtual memory page of the system memory page 103 from consideration by the copy-on-write processing, maps the second virtual memory page of the system memory page 103 to the physical memory page 121 and causes the write attempt to be retried. This write attempt of the virtual address will now map to a physical address within what used to be the available physical memory page 115 and the write attempt will succeed because that physical memory page is no longer write-protected with respect to the PAS#1 process-context 105. Other processes that share the physical memory page 121 need not affected.

Figure 3:
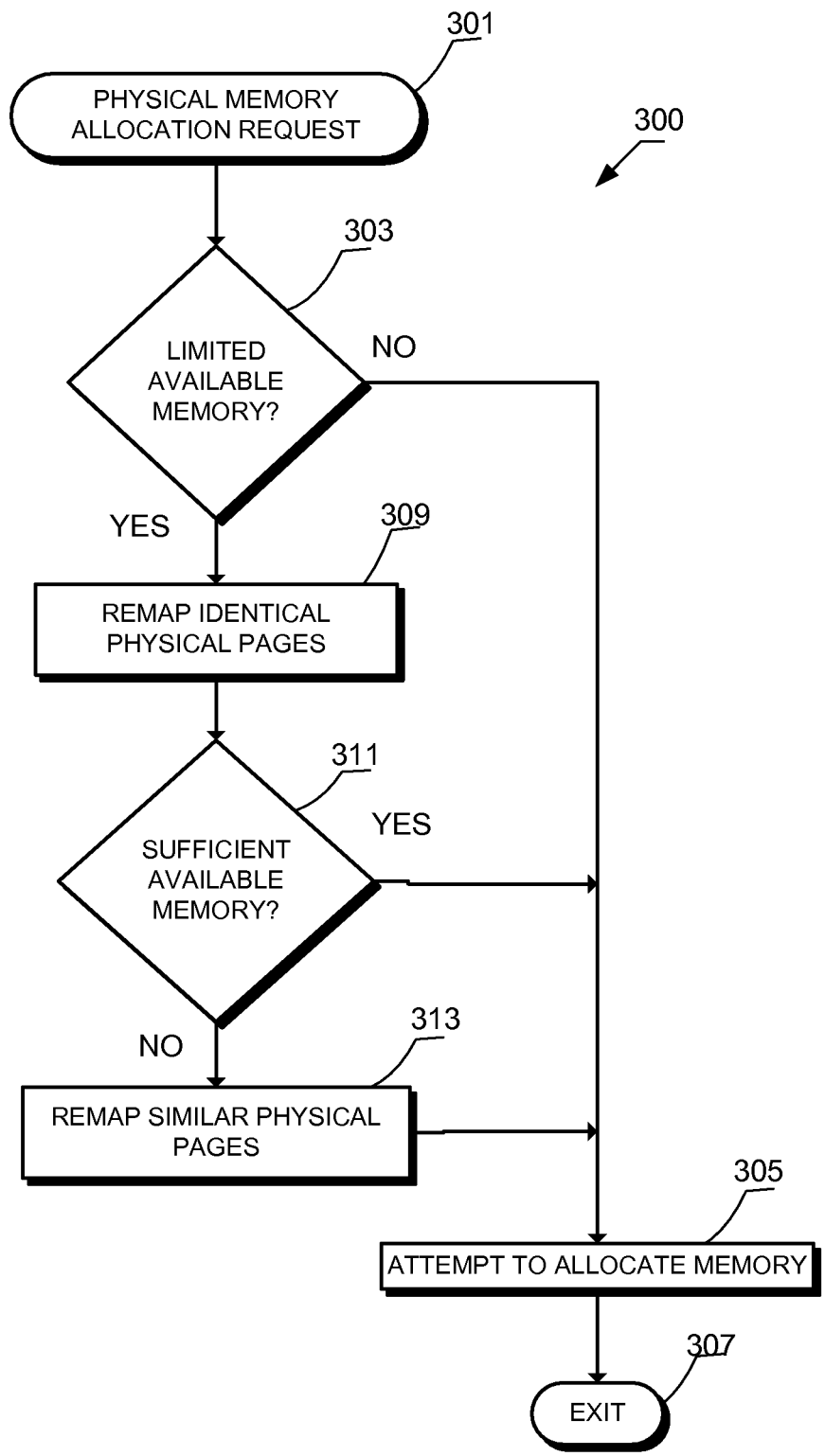
FIG. 3 illustrates an overview of a new physical memory allocation process.

The technology disclosed herein detects when a memory-constrained computing device starts to run out of unallocated physical memory pages. It then attempts to recycle physical memory pages having content that is identical to, or similar to the content of another physical memory page. It then remaps the process-contexts to share the remaining physical memory page(s). FIG. 3 provides an overview of the technology.

FIG. 3 illustrates a 'physical memory allocation' process 300 that can be invoked, for example, when an operating system needs to allocate physical memory. Once invoked, the 'physical memory allocation' process 300 initiates at a 'receive allocation request' entry terminal 301, receives a physical memory allocation request, and continues to a 'limited unallocated memory' decision procedure 303. The 'limited unallocated memory' decision procedure 303 determines the amount of unallocated physical memory available to the operating system that can be used to satisfy the physical memory allocation request. If the amount of unallocated physical memory that would remain after performing the requested allocation is sufficiently large such that satisfying the physical memory allocation request would not significantly impact the system, the 'physical memory allocation' process 300 continues directly to an 'allocate physical memory' procedure 305. The 'allocate physical memory' procedure 305 uses known techniques for satisfying the physical memory allocation request. After the requested amount of physical memory is allocated, the 'physical memory allocation' process 300 completes through an exit terminal 307. In most computing environments, physical memory is allocated by allocating physical memory pages in conjunction with the memory management unit.

However, if the 'limited unallocated memory' decision procedure 303 determines that the amount of unallocated physical memory that would remain after performing the requested allocation is such that satisfying the physical memory allocation request would significantly impact the system, the 'physical memory allocation' process 300 continues to a 'remap identical physical memory pages' procedure 309.

The physical memory allocation request could determine whether the physical memory allocation request would significantly impact the system by, for example, comparing the amount of unallocated physical memory minus the allocation request to a static or dynamically determined threshold. This determination can be made using memory page metrics.

The 'remap identical physical memory pages' procedure 309 identifies allocated physical memory pages that have identical content and that could be shared between process-contexts as candidate pages that could be recycled. It remaps the process-contexts to one of the physical memory pages and releases the other physical memory page candidates that have identical content. The process-contexts are not given write access to the shared physical memory page. Thus, at least some of the allocated physical memory pages that have identical content can be recycled and made available to satisfy the physical memory allocation request. The 'remap identical physical memory pages' procedure 309 is subsequently described in detail with respect to FIG. 4.

After physical memory pages that have identical content have been recycled, a 'sufficient unallocated memory' decision procedure 311 determines whether there is now sufficient unallocated physical memory to satisfy the physical memory allocation request in a similar manner as the 'limited unallocated memory' decision procedure 303 previously described. If there is now sufficient unallocated physical memory, the 'physical memory allocation' process 300 continues to the 'allocate physical memory' procedure 305 as previously described.

However, if the 'sufficient unallocated memory' decision procedure 311 determines there is still insufficient unallocated physical memory to satisfy the physical memory allocation request, the 'physical memory allocation' process 300 continues to a 'remap similar physical memory pages' procedure 313. The 'remap similar physical memory pages' procedure 313 detects physical memory page candidates that have substantially similar content, selects one of these physical memory pages as a reference page, determines a content difference that represents the data differences between a similar physical memory page with respect to the reference page, associates the content difference with the physical memory page-process-context and remaps the process-contexts to the reference physical memory page as is subsequently described in detail with respect to FIG. 5 and FIG. 6. Then the 'physical memory allocation' process 300 continues to the 'allocate physical memory' procedure 305 as previously discussed. The remapping of the process-context to the reference physical memory page disables the process-context's read access mode and write access mode to the reference physical memory page.

One skilled in the art will understand that although the 'physical memory allocation' process 300 can recover significant amounts of physical memory, it is still possible that the memory allocation request cannot be satisfied and will generate, for example, an out-of-memory exception. Such a one will also understand that out-of-memory errors are generally unrecoverable and that the technology described herein improves the allocation efficiency for memory constrained systems when the number of unallocated physical memory pages becomes small.

Figure 4:
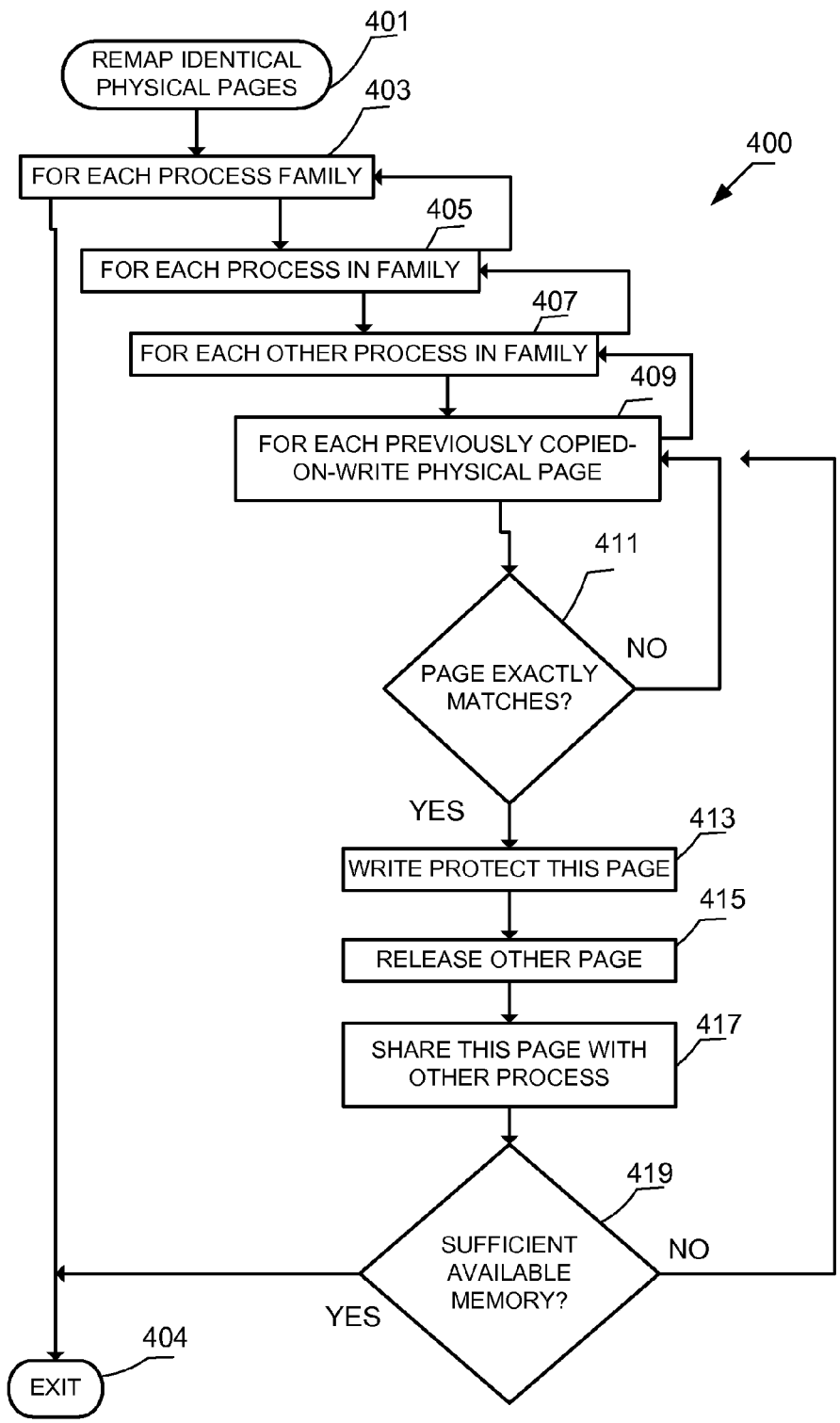
FIG. 4 illustrates a process to remap identical physical memory pages.

FIG. 4 illustrates one method that can be used to detect and remap physical memory pages that have identical content. This embodiment operates by identifying process families which are likely to have identical content. Once physical memory pages with identical content are located, the associated process-contexts are remapped to a single physical memory page and the other allocated physical memory pages can be recycled to free them for subsequent allocation. If sufficient unallocated physical memory pages result from the operation of this method, the physical memory allocation request can be fulfilled.

An example of a process-family is the parent process and its child processes. It is likely that these processes will map to a number of separate physical memory pages that have identical content. This situation is even more likely if the physical memory pages were allocated responsive to detection of a write operation on a copy-on-write physical memory page.

For example within the UNIX environment, a process-family can be the parent process and its child processes. It is likely that these processes will map to a number of separate physical memory pages that have identical content. This situation is even more likely if the physical memory pages were allocated responsive to detection of an attempted write operation to a physical memory page marked as copy-on-write. To be more specific for this embodiment, process-families that are likely to have identical content can be determined by identifying processes that have performed a fork( ) operation as these processes can eventually result in the allocation of physical memory pages that have identical content resulting from a write attempt to copy-on-write physical memory page. In this circumstance, a process-context of a child process can have a number of allocated physical memory pages that have identical content with physical memory pages allocated to the process-context of its parent process or to its sibling processes.

FIG. 4 illustrates a 'remap identical physical memory page' process 400 that can be invoked by the 'remap identical physical memory pages' procedure 309 and that initiates at a remap identical pages entry terminal 401. The 'remap identical physical memory page' process 400 continues to an 'iterate each process-family' procedure 403 that iterates each process-family. After all the process-families are iterated, the 'remap identical physical memory page' process 400 completes through an exit terminal 404 (and the 'physical memory allocation' process 300 will continue through the 'sufficient unallocated memory' decision procedure 311 to the 'allocate physical memory' procedure 305 as previously described with respect to FIG. 3).

For each iterated process-family, an 'iterate each process in family' procedure 405 iterates each process-context within the process-family. For each iterated process-context, an 'iterate each other process in family' procedure 407 iterates the other process-contexts within the process-family. These iterations establish a process-pair.

An efficient way to determine whether the physical memory pages have identical content is to examine whether physical memory pages of each of the process-pair were allocated as a result of a copy-on-write operation and then compare the corresponding physical memory page pairs. Another way is to compare the content of each physical memory page allocated to one process-context of the process-pair with the content of each physical memory page allocated to the other process-context of the process-pair.

Thus, in one embodiment, for each iterated process-pair, an 'iterate each previously COW page' procedure 409 determines which if any physical memory page mapped to one process-context was allocated as a result of a copy-on-write operation. An 'identical pages' decision procedure 411 then determines whether the page-pair has identical content. If the page-pair does not have identical content, the 'remap identical physical memory page' process 400 continues to the 'iterate each previously COW page' procedure 409 to iterate the next physical memory page (or page-pair) for comparison.

However, if the 'identical pages' decision procedure 411 determines that the page-pair has identical content, the 'physical memory allocation' process 300 continues to a 'write protect this page' procedure 413 that disables the write access mode of one of the physical memory page of the page-pair with respect to its process-context. A 'release other page' procedure 415 recycles the other physical memory page of the page-pair. A 'share page with other process' procedure 417 remaps the other process-context to the retained physical memory page and disables the write access mode of the other process-context to the now-shared physical memory page.

Next, a 'sufficient memory' decision procedure 419 determines whether there are sufficient unallocated physical memory pages to satisfy the physical memory allocation request without significant impact on the system. If there are sufficient unallocated physical memory pages, the 'remap identical physical memory page' process 400 complete through the exit terminal 404 (and the 'physical memory allocation' process 300 will continue through the 'sufficient unallocated memory' decision procedure 311 to the 'allocate physical memory' procedure 305 as previously described with respect to FIG. 3).

However, if the 'sufficient memory' decision procedure 419 determines that there is still insufficient unallocated physical memory pages, the 'remap identical physical memory page' process 400 returns to the 'iterate each previously COW page' procedure 409 to continue remapping physical memory pages that have identical content.

Once the 'iterate each process-family' procedure 403 completes, there may still be insufficient unallocated physical memory pages to satisfy the physical memory allocation request without significant impact on the system. If sufficient physical memory pages are not recycled by the 'remap identical physical memory page' process 400, the disclosed technology attempts to recycle physical memory pages that have substantially similar content. That is, physical memory pages that have substantially similar content are those physical memory pages where the content of the physical memory pages is mostly identical with only a few differences. Process-contexts can share such a physical memory page if a content difference is associated with each process-context that maps to that physical memory page.

For example in one embodiment, every access to the page posts an exception to code that will either return data values from the shared physical memory page or from the content difference associated with the accessing process-context.

In another embodiment, after the physical memory pages with substantially similar content are remapped, when a process-context accesses the shared physical memory page that is associated with a content difference, an unallocated physical memory page is allocated and initialized from content copied from the shared physical memory page and as adjusted by the associated content difference. Then the process-context is mapped to the newly allocated physical memory page.

Figure 5:
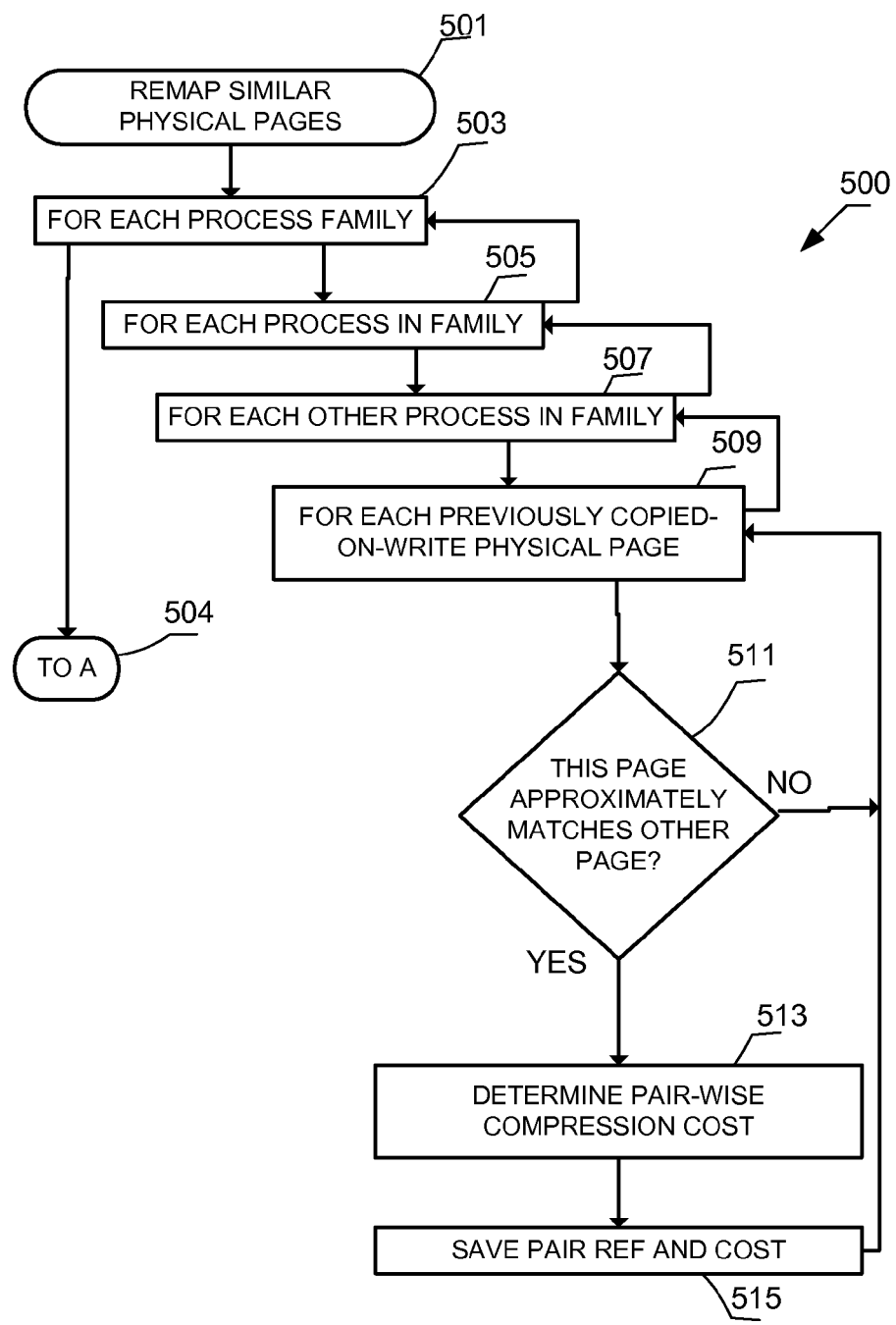
FIG. 5 illustrates a process to identify similar physical memory pages.

FIG. 5 illustrates an 'identify similar physical memory pages' process 500 that can be invoked by the 'remap similar physical memory pages' procedure 313 of FIG. 3 and that initiates through an 'approximate merge entry' terminal 501. Once initiated, an 'iterate each process-family' procedure 503 iterates each process-family as previously described with respect to FIG. 4. After iterating all process-families, the 'identify similar physical memory pages' process 500 will have accumulated page-pair compression costs that will be used to determine which page-pairs are first remapped. That information is passed to a remap similar physical memory pages process 600 (subsequently described with respect to FIG. 6) through a continuation exit terminal 504.

Each process-family iterated by the 'iterate each process-family' procedure 503 is passed to an 'iterate each process in family' procedure 505 that iterates each process in the process-family. For each iterated process, an 'iterate each other process in family' procedure 507 iterates each process in the process-family other than the process iterated by the 'iterate each process in family' procedure 505. For each process-pair, an 'iterate each previously COW page' procedure 509 identifies page-pairs for the process-pair.

For each identified page-pair, a 'substantially similar page-pair' decision procedure 511 determines whether the separate physical memory pages in the page-pair have substantially similar content such as by comparing the content of the two physical memory pages and evaluating the differences in content. If the page-pair does not have substantially similar content, the 'identify similar physical memory pages' process 500 continues back to the 'iterate each previously COW page' procedure 509 to generate the next page-pair.

However, if the 'substantially similar page-pair' decision procedure 511 determines that the page-pair does have substantially similar content, the 'identify similar physical memory pages' process 500 continues to a 'determine pairwise compression cost' procedure 513 that evaluates the differences between the physical memory pages of the page-pair and determines the related compression cost. The compression cost for the page-pair is saved by a 'save page-pair identity and compression cost' procedure 515 for subsequent use by the remap similar physical memory pages process 600. After the compression cost for the page-pair is saved, the 'identify similar physical memory pages' process 500 continues back to the 'iterate each previously COW page' procedure 509 to continue accumulating page-pairs that have substantially similar content. Once the page-pair compression costs are determined and the 'iterate each process-family' procedure 503 completes, the remap similar physical memory pages process 600 selects which physical memory pages to remap and recycle.

Figure 6:
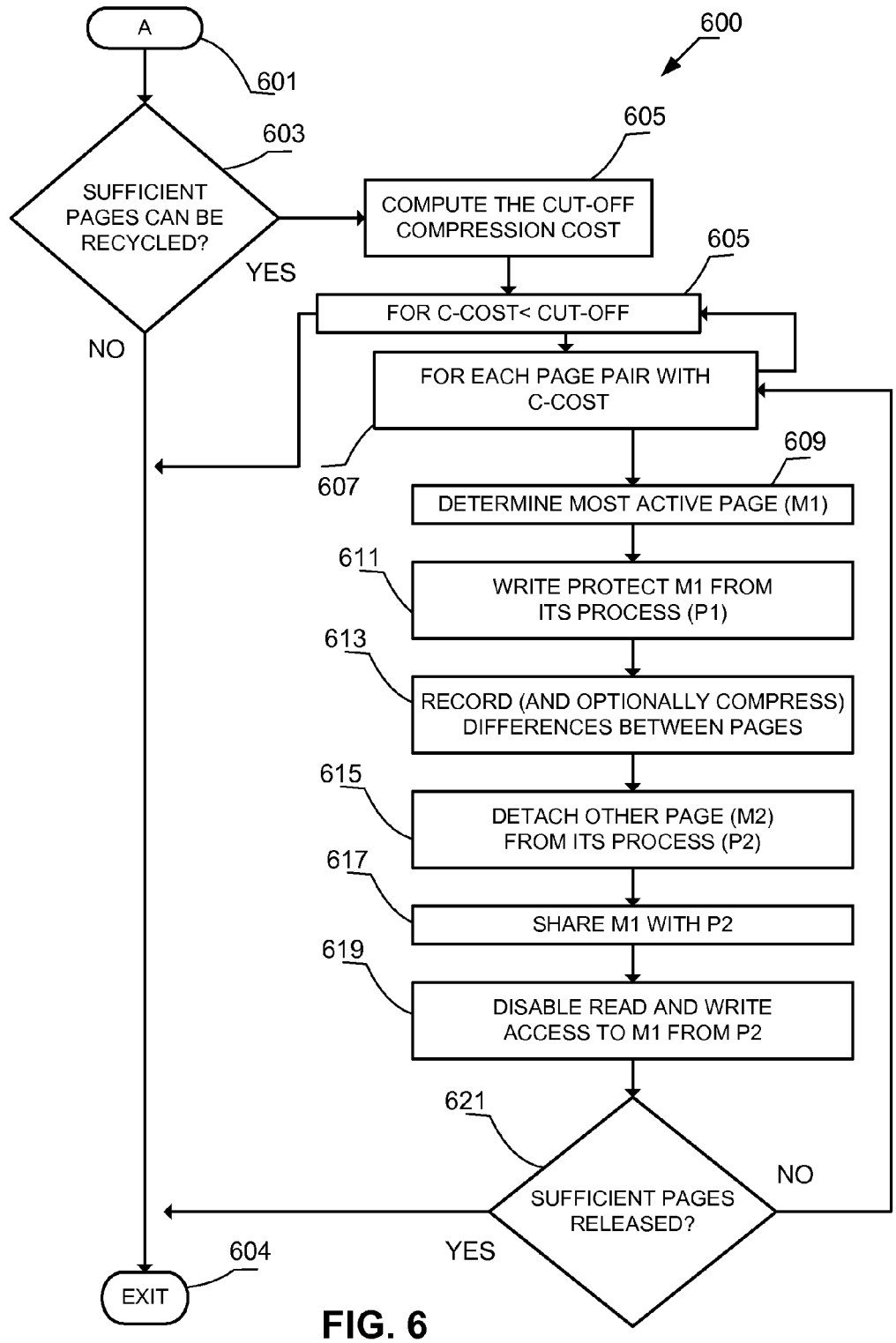
FIG. 6 illustrates a process to remap similar physical memory pages identified by FIG. 5.

FIG. 6 illustrates the remap similar physical memory pages process 600 that remaps and recycles physical memory page that have substantially similar content. The remap similar physical memory pages process 600 processes the results from the 'identify similar physical memory pages' process 500 and initiates at a continuation entry terminal 601 as execution continues through the continuation exit terminal 504. The goal of the remap similar physical memory pages process 600 is to remap a sufficient number of the lowest compression cost page-pairs to increase the set of unallocated physical memory pages such that the physical memory allocation request can be satisfied without undue impact on the operation of the system.

A 'sufficient physical memory pages recyclable' decision procedure 603 determines from the page-pair compression cost information provided by the 'identify similar physical memory pages' process 500 whether sufficient physical memory pages can be recycled to satisfy the physical memory allocation request. If sufficient physical memory pages can not be recycled the remap similar physical memory pages process 600 continues to an exit terminal 604 after which the 'allocate physical memory' procedure 305 of FIG. 3 will attempt to satisfy the physical memory allocation request.

The attempt to satisfy the physical memory allocation request will most likely fail if the system does not have sufficient unallocated physical memory pages. Note, that it is also possible that the 'allocate physical memory' procedure 305 will be able to satisfy the physical memory allocation request, but by doing so will reduce the number of unallocated physical memory pages to the point of drastically impacting the operation of the system.

However, if the 'sufficient physical memory pages recyclable' decision procedure 603 determines that sufficient physical memory pages can be recycled to satisfy the physical memory allocation request, the remap similar physical memory pages process 600 continues to a 'compute cut-off compression cost' procedure 605. The 'compute cut-off compression cost' procedure 605 computes a compression cost threshold by evaluating the number of physical memory pages that can be recovered against the physical memory allocation request and the current set of unallocated physical memory pages.

An 'iterate selected page-pairs' procedure 607 then iterates page-pairs that have a compression cost smaller than the compression cost threshold computed by the 'compute cut-off compression cost' procedure 605. In one embodiment, each iterated page-pair is examined by a 'determine page-pair activity' procedure 609 to determine which physical memory page of the page-pair is the more active (for example by looking at data maintained by the memory management unit and/or other system data).

A 'write protect more active page from its process (P1)' procedure 611 then disables the write access mode for the process-context to the more active physical memory page. The content difference between the more active physical memory page and the other physical memory page of the page-pair are recorded and the differences optionally compressed by a 'record and compress differences in page-pair' procedure 613. The less active physical memory page is then unmapped from its process-context by a 'detach less active page from its process (P2)' procedure 615 and recycled. Next a 'share more active page' procedure 617 maps the more active physical memory page to process-context (P2) in place of the recycled physical memory page, associates the content difference with the more active physical memory page and the process-context (P2). A 'disable read and write access to more active page from (P2)' procedure 619 then disables the read access mode and the write access mode for process-context (P2) with respect to the more active physical memory page such that any read or write attempt by process-context (P2) will be a prohibited access attempt and cause a memory access exception.

A 'sufficient released pages' decision procedure 621 determines whether the current set of unallocated physical memory pages is sufficient to safely satisfy the physical memory allocation request. If there are sufficient unallocated physical memory pages, the remap similar physical memory pages process 600 continues to the exit terminal 604. The 'allocate physical memory' procedure 305 will successfully satisfy the physical memory allocation request because sufficient unallocated physical memory pages are now available to satisfy the request without undue impact on the system.

However, if at the 'sufficient released pages' decision procedure 621 sufficient physical memory pages have not yet been recycled to satisfy the physical memory allocation request, the remap similar physical memory pages process 600 will continue to the 'iterate selected page-pairs' procedure 607 to continue processing other page-pairs.

Figure 7:
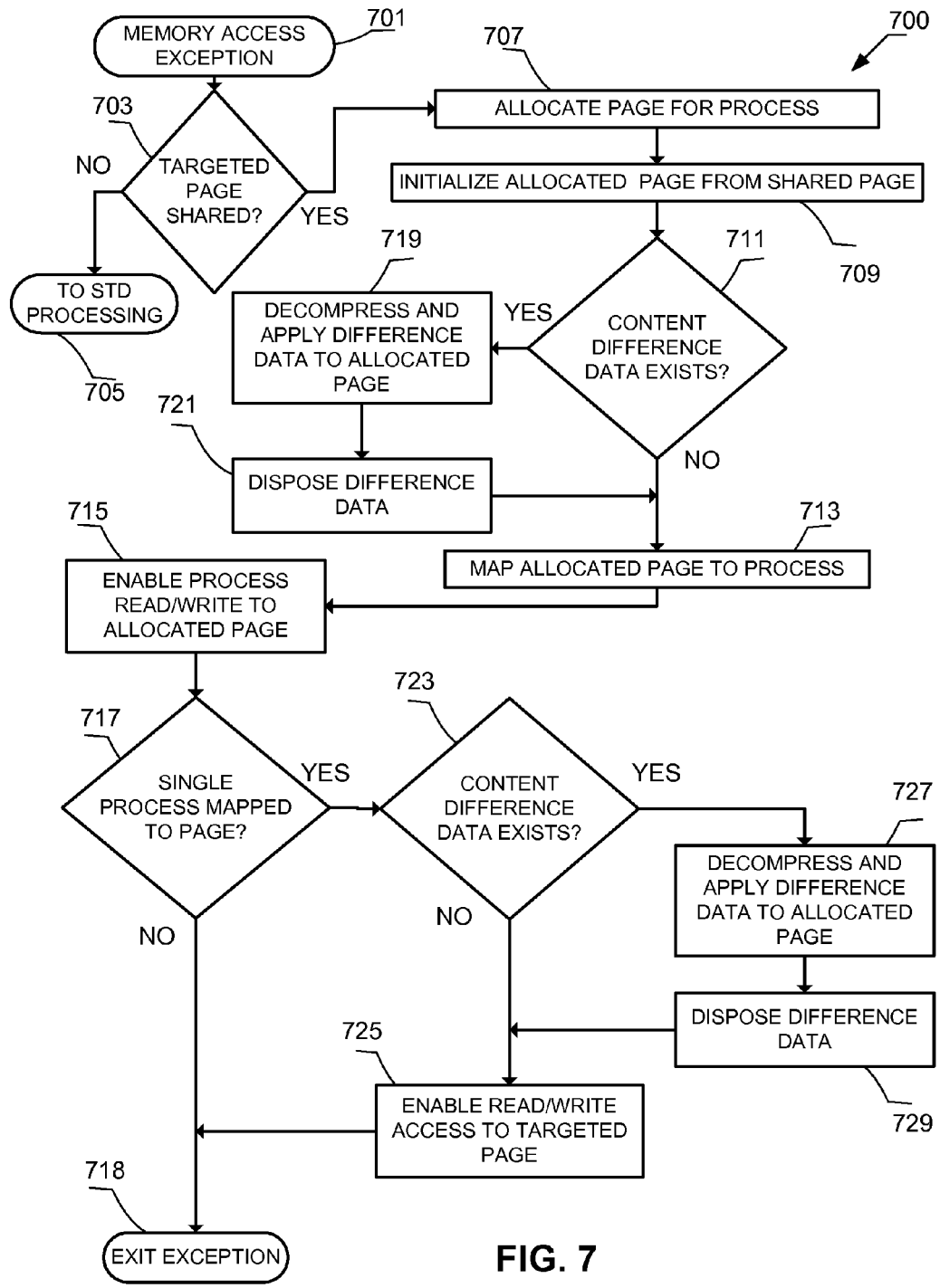
FIG. 7 illustrates a physical memory page access violation exception handling process that is invoked when the memory management unit traps a prohibited access attempt to a physical memory page and posts an exception.

The result of processes described with respect to FIG. 3, FIG. 4, and FIG. 5 is that 1) a number of process-contexts have read-only access to shared physical memory pages; and/or 2) a number of process-contexts have neither read nor write access to shared physical memory pages (although the shared physical memory pages are mapped to the process-contexts). Thus, a write attempt to any of these shared physical memory pages, or a read attempt by a process-context to a shared physical memory page that is associated with a content difference will cause an exception due to the prohibited access attempt. FIG. 7 illustrates one embodiment for handling the exception.

FIG. 7 illustrates a physical memory page access violation exception handling process 700 that is invoked when the memory management unit traps a prohibited access attempt to a physical memory page and posts an exception. The physical memory page access violation exception handling process 700 initiates at an exception entry terminal 701 and continues to an 'exception on shared physical memory page' decision procedure 703 that determines whether the prohibited access attempt was targeted to a physical memory page shared by two or more process-contexts (that physical memory page referenced by the term "targeted page"). If the targeted page is a physical memory page that is not shared, the physical memory page access violation exception handling process 700 continues to an exit to standard exception handling terminal 705 that processes and resolves the exception using known techniques.

However, if the 'exception on shared physical memory page' decision procedure 703 determines that the targeted page is a shared physical memory page, the physical memory page access violation exception handling process 700 continues to an 'allocate page for process' procedure 707 that allocates one of the remaining unallocated physical memory pages. An 'initialize allocated page from shared page content' procedure 709 initializes the newly allocated physical memory page with a copy of the content of the targeted page. Then, a 'difference data exists' decision procedure 711 determines whether content difference information is associated with the process-context and the targeted page. If the targeted page/process-context does not associate a content difference, the physical memory page access violation exception handling process 700 continues to a 'map allocated page to process-context' procedure 713. The 'map allocated page to process-context' procedure 713 maps the allocated physical memory page to the process-context that caused the exception in place of the targeted page.

Because the newly allocated physical memory page is not shared, an 'enable read/write access by process-context to allocated page' procedure 715 can enable both the read access mode and the write access mode for the process-context to the newly allocated physical memory page.

Next, a 'single process-context' decision procedure 717 determines whether the targeted page is now mapped by only one process-context (if so, the targeted page is no longer shared and the remaining process can be given exclusive access to the targeted page as is subsequently described). If the targeted page is still shared the physical memory page access violation exception handling process 700 continues to an exit exception terminal 718 that uses known techniques to retry the memory access that was previously trapped (and because the process-context now has read/write access to its own updated copy of the targeted page, the access will be successful).

Looking again at the 'difference data exists' decision procedure 711, if the copied physical memory page/process-context has an associated content difference (that being the difference, for example, between the content of the targeted page and the substantially similar content from the physical memory page that was released by the 'detach less active page from its process (P2)' procedure 615) the physical memory page access violation exception handling process 700 continues to an 'apply content difference' procedure 719 that modifies the content of the newly allocated physical memory page in accordance with the content difference. Once the content of the copied page is modified, a 'dispose content difference for process/page' procedure 721 deletes the content difference as it is no longer needed. The physical memory page access violation exception handling process 700 then continues to the 'map allocated page to process-context' procedure 713 for processing as previously described.

Looking again at the 'single process-context' decision procedure 717, if the targeted page is mapped only by one process-context, then the targeted page is no longer shared and the process-context that maps to the physical memory page can have full access to the targeted page. In this situation, the physical memory page access violation exception handling process 700 continues to a 'difference data exists' decision procedure 723 (similar to the 'difference data exists' decision procedure 711) that determines whether the process-context has an associated content difference for the targeted page. If not, the physical memory page access violation exception handling process 700 continues to an 'enable read/write access by process-context' procedure 725 that can enable the read access mode and the write access mode for the sole process-context attached to the targeted page.

However, if the 'difference data exists' decision procedure 723 determines that the targeted page/process-context has an associated content difference (that being the difference, for example, between the content of the targeted page and the substantially similar content from a physical memory page released by the 'detach less active page from its process (P2)' procedure 615), the physical memory page access violation exception handling process 700 continues to an 'apply content difference' procedure 727 that modifies the content of the newly allocated physical memory page in accordance with the content difference. Once the content of the copied page is updated, a 'dispose content difference for process/page' procedure 729 deletes the content difference as it is no longer needed. The physical memory page access violation exception handling process 700 then continues to the 'enable read/write access by process-context' procedure 725 for processing as previously described.

One skilled in the art will understand that the term identical content is more restrictive than the term substantially similar content. Where substantially similar content allows for some difference in the content, identical content makes no such allowance.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, the methods and processes described herein can be implemented with logics such as a memory allocation request receiver logic, a low memory determination logic, a remap logic, a candidate identification logic, a page mapping logic, access mode logic, an access mode logic, a memory allocation logic, a content comparison logic, a mode control logic, an exception receiver logic, a shared memory page determination, allocation logic, an allocation logic, a copy logic, a second page remap logic, and a content update logic. One skilled in the art would be able to implement hardware, software, or combination that would performs the s methods and processes described herein without undue experimentation.

One skilled in the art will understand that the network carries information (such as informational data as well as data that defines a computer program). The information can also be propagated using a carrier-wave. Signals capable of propagating the information includes electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, can be a computer-usable data carrier.

One skilled in the art will understand that the technology disclosed herein improves the efficiency of physical memory allocation in situations where the available physical memory is limited.

From the foregoing, it will be appreciated that the technology has (without limitation) the following advantages:

1) Improved physical memory allocation for memory constrained devices when the amount of unallocated memory approaches a threshold.

2) Delays the onset of system failure resulting from memory starvation by recycling memory pages that have substantially similar content (including identical content). Thus, increasing the amount of amount of unallocated memory available to the system.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer controlled method within a computing environment, said computing environment comprising a memory management unit configured to map a virtual memory page of a process-context to a physical memory page, wherein access to said physical memory page by said process-context is controlled by an access permission logic responsive to a plurality of memory access modes, said access permission logic configured to post an exception upon detection of a prohibited access attempt of said physical memory page by said process-context, said plurality of memory access modes including a read access mode and a write access mode, said computing environment including a plurality of allocated physical memory pages, and a plurality of unallocated physical memory pages; said method comprising:
  receiving a physical memory allocation request;
  determining whether satisfying said physical memory allocation request would reduce the number of said plurality of unallocated physical memory pages below a threshold;
  remapping a plurality of process-contexts responsive to determining, wherein remapping further comprises:
    identifying a first process-context containing a first process-context mapping to a first allocated physical memory page and a second process-context containing a second process-context mapping to a second allocated physical memory page from said plurality of process-contexts, said first allocated physical memory page and said second allocated physical memory page having substantially similar content;
    altering said second process-context mapping to map to said first allocated physical memory page; and
    specifying one or more of said plurality of memory access modes on said first allocated physical memory page with respect to at least one of said first process-context or said second process-context;
  adding said second allocated physical memory page to said plurality of unallocated physical memory pages; and
  processing said physical memory allocation request.

2. The computer controlled method of claim 1, wherein said substantially similar content is identical content.

3. The computer controlled method of claim 1, wherein altering said second process-context mapping further comprises determining a content difference between said first allocated physical memory page and said second allocated physical memory page, and associating said content difference with said second process-context mapping; and wherein specifying further comprises disabling said read access mode and said write access mode with respect to said second process-context to said first allocated physical memory page.

4. The computer controlled method of claim 1, wherein further comprising:
  receiving said exception resulting from a prohibited access attempt to said first allocated physical memory page by an accessing process-context of said plurality of process-contexts, said accessing process-context having an accessing-process-context mapping to said first allocated physical memory page;
  determining that said first allocated physical memory page is shared by at least one other process-context in said plurality of process-contexts;
  allocating a newly allocated physical memory page from said plurality of unallocated physical memory pages
  copying said first allocated physical memory page content to said newly allocated physical memory page;
  altering said accessing-process-context mapping to map to said newly allocated physical memory page; and
  enabling said read access mode and said write access mode to said newly allocated physical memory page from said accessing process-context.

5. The computer controlled method of claim 4, wherein said substantially similar content is identical content.

6. The computer controlled method of claim 4, wherein said substantially similar content is associated with a content difference and said accessing-process-context mapping, and wherein copying further comprises altering said content of said newly allocated physical memory page responsive to said content difference.

7. An apparatus having a central processing unit (CPU) and a memory coupled to said CPU forming a computing environment, said memory organized into a plurality of physical memory pages, said computing environment comprising a memory management unit configured to map a virtual memory page of a process-context to a physical memory page of said plurality of physical memory pages, wherein access to said physical memory page by said process-context is controlled by an access permission logic responsive to a plurality of memory access modes, said access permission logic configured to post an exception upon detection of a prohibited access attempt of said physical memory page by said process-context, said plurality of memory access modes including a read access mode and a write access mode, said computing environment including a plurality of allocated physical memory pages, and a plurality of unallocated physical memory pages; said apparatus comprises:
  a memory allocation request receiver logic configured to receive a physical memory allocation request;
  a low memory determination logic configured to determine whether satisfying said physical memory allocation request received by the memory allocation request receiver logic would reduce the number of said plurality of unallocated physical memory pages below a threshold;
  a remap logic configured to remap a plurality of process-contexts responsive to the low memory determination logic, wherein the remap logic further comprises:
    a candidate identification logic configured to identify a first process-context containing a first process-context mapping to a first allocated physical memory page and a second process-context containing a second process-context mapping to a second allocated physical memory page from said plurality of process-contexts, said first allocated physical memory page and said second allocated physical memory page having substantially similar content;

a page mapping logic configured to alter said second process-context mapping to map to said first allocated physical memory page and responsive to the candidate identification logic; and an access mode logic configured to specify one or more of said plurality of memory access modes on said first allocated physical memory page with respect to at least one of said first process-context or said second process-context;

a recycle logic configured to add said second allocated physical memory page to said plurality of unallocated physical memory pages; and a memory allocation logic configured to process said physical memory allocation request.

8. The apparatus of claim 7, wherein said substantially similar content is identical content.

9. The apparatus of claim 7, wherein the page mapping logic further comprises a content comparison logic configured to determine a content difference between said first allocated physical memory page and said second allocated physical memory page and to associate said content difference with said second process-context mapping; and wherein the access mode logic further comprises a mode control logic configured to disable said read access mode and said write access mode with respect to said second process-context to said first allocated physical memory page.

10. The apparatus of claim 7, wherein further comprising:

an exception receiver logic configured to receive said exception resulting from a prohibited access attempt to said first allocated physical memory page by an accessing process-context of said plurality of process-contexts, said accessing process-context having an accessing-process-context mapping to said first allocated physical memory page;

a shared memory page determination logic configured to determine that said first allocated physical memory page is shared by at least one other process-context in said plurality of process-contexts, the shared memory page determination responsive to the exception receiver logic; and wherein a newly allocated physical memory page from said plurality of unallocated physical memory pages is allocated by the memory allocation logic responsive to the shared memory page determination;

a copy logic, responsive to the shared memory page determination, configured to copy said first allocated physical memory page content to said newly allocated physical memory page; and a second page remap logic configured to alter said accessing-process-context mapping to map to said newly allocated physical memory page; and wherein the access mode logic enables said read access mode and said write access mode to said newly allocated physical memory page from said accessing process-context.

11. The apparatus of claim 10, wherein said substantially similar content is identical content.

12. The apparatus of claim 10, wherein said substantially similar content is associated with a content difference and said accessing-process-context mapping, and wherein the copy logic further comprises a content update logic configured to alter said content of said newly allocated physical memory page responsive to said content difference.

13. A computer program product comprising within a computing environment, said computing environment comprising a memory management unit configured to map a virtual memory page of a process-context to a physical memory page, wherein access to said physical memory page by said process-context is controlled by an access permission logic responsive to a plurality of memory access modes, said access permission logic configured to post an exception upon detection of a prohibited access attempt of said physical memory page by said process-context, said plurality of memory access modes including a read access mode and a write access mode, said computing environment including a plurality of allocated physical memory pages, and a plurality of unallocated physical memory pages;

a computer-usable data carrier providing instructions that, when executed by a computer, cause said computer to perform a method comprising:

receiving a physical memory allocation request;

determining whether satisfying said physical memory allocation request would reduce the number of said plurality of unallocated physical memory pages below a threshold;

remapping a plurality of process-contexts responsive to determining, wherein remapping further comprises:

identifying a first process-context containing a first process-context mapping to a first allocated physical memory page and a second process-context containing a second process-context mapping to a second allocated physical memory page from said plurality of process-contexts, said first allocated physical memory page and said second allocated physical memory page having substantially similar content;

altering said second process-context mapping to map to said first allocated physical memory page; and specifying one or more of said plurality of memory access modes on said first allocated physical memory page with respect to at least one of said first process-context or said second process-context;

adding said second allocated physical memory page to said plurality of unallocated physical memory pages; and processing said physical memory allocation request.

14. The computer program product of claim 13, wherein said substantially similar content is identical content.

15. The computer program product of claim 13, wherein altering said second process-context mapping further comprises determining a content difference between said first allocated physical memory page and said second allocated physical memory page, and associating said content difference with said second process-context mapping; and wherein specifying further comprises disabling said read access mode and said write access mode with respect to said second process-context to said first allocated physical memory page.

16. The computer program product of claim 13, wherein further comprising:

receiving said exception resulting from a prohibited access attempt to said first allocated physical memory page by an accessing process-context of said plurality of process-contexts, said accessing process-context having an accessing-process-context mapping to said first allocated physical memory page;

determining that said first allocated physical memory page is shared by at least one other process-context in said plurality of process-contexts;

allocating a newly allocated physical memory page from said plurality of unallocated physical memory pages copying said first allocated physical memory page content to said newly allocated physical memory page;

altering said accessing-process-context mapping to map to said newly allocated physical memory page; and enabling said read access mode and said write access mode to said newly allocated physical memory page from said accessing process-context.

17. The computer program product of claim 16, wherein said substantially similar content is identical content.

18. The computer program product of claim 16, wherein said substantially similar content is associated with a content difference and said accessing-process-context mapping, and wherein copying further comprises altering said content of said newly allocated physical memory page responsive to said content difference.

* * * * *